(12) United States Patent
Reeves et al.

(10) Patent No.: US 9,876,866 B1
(45) Date of Patent: Jan. 23, 2018

(54) PROVIDING LOCATION-BASED DATA TO SECONDARY CONTENT PROVIDERS VIA PRIMARY CONTENT PROVIDERS

(75) Inventors: Raymond Emilio Reeves, Olathe, KS (US); John A. Hale, Kansas City, MO (US); Ryan Alan Wick, Punta Gorda, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 1758 days.

(21) Appl. No.: 12/355,511

(22) Filed: Jan. 16, 2009

(51) Int. Cl.
*G06F 15/16* (2006.01)
*H04L 29/08* (2006.01)

(52) U.S. Cl.
CPC .................................... *H04L 67/18* (2013.01)

(58) Field of Classification Search
CPC ....................................................... H04L 67/18
USPC ............................. 709/238; 705/14; 370/229
See application file for complete search history.

(56) References Cited

U.S. PATENT DOCUMENTS

| | | | |
|---|---|---|---|
| 6,839,742 B1* | 1/2005 | Dyer et al. ..................... | 709/217 |
| 7,787,872 B2* | 8/2010 | Minborg et al. .............. | 455/415 |
| 8,060,616 B1* | 11/2011 | Richardson et al. ......... | 709/226 |
| 2004/0047287 A1* | 3/2004 | Tremblay et al. ............ | 370/229 |
| 2004/0102197 A1* | 5/2004 | Dietz ........................ | 455/456.1 |
| 2010/0042742 A1* | 2/2010 | Christianson et al. ....... | 709/238 |
| 2010/0121718 A1* | 5/2010 | AlanDietz .................. | 705/14.58 |

* cited by examiner

*Primary Examiner* — Philip Chea
*Assistant Examiner* — Robert B McAdams (57) ABSTRACT

Systems, methods, and computer-readable media for providing location-based data to secondary content providers via primary content providers are provided. In embodiments, a content request is received from a user device. The content request includes an indication of a primary content provider to which the content request is directed and a secondary content provider to which location-based data is to be transmitted. Upon identifying that location-based data is to be provided to the primary content provider, the location-based data is provided to the primary content provider, which then relays the location-based data to the secondary content provider.

15 Claims, 4 Drawing Sheets

PROVIDING LOCATION-BASED DATA TO SECONDARY CONTENT PROVIDERS VIA PRIMARY CONTENT PROVIDERS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a set of computer-useable instructions provides one or more computer-readable media having computer-executable instructions embodied thereon that, when executed, perform a method for providing location-based data to secondary content providers via primary content providers. A content request is received from a user device. The content request includes a destination indicator that indicates a primary content provider to which the content request is directed and a secondary provider indicator that indicates a secondary content provider to which location-based data is to be transmitted. The destination indicator that indicates a primary content provider is used to identify that location-based data is to be provided to the primary content provider. The location-based data is provided to the primary content provider that relays the location-based data to the secondary content provider.

In a second aspect, a set of computer-useable instructions provides one or more computer-readable media having computer-executable instructions embodied thereon that, when executed, perform a method for providing location-based data to secondary content providers via primary content providers. The method includes receiving at a primary content provider a content request that includes location-based data that provides a location of a user device and a secondary provider indicator that indicates a secondary content provider to which the location-based data is to be transmitted. An indication to provide the location-based data to the secondary content provider identified in the content request is identified. The location-based data is provided to the secondary content provider so that the secondary content provider can provide web-based content related to the location of the user device.

In a third aspect, a set of computer-useable instructions provides one or more computer-readable media having computer-executable instructions embodied thereon that, when executed, perform a method for providing location-based data to secondary content providers via primary content providers. The method includes receiving at a secondary content provider a content request that requests for web-based content to be provided to a user device. Web-based content is provided to the user device. The web-based content includes an enabling Uniform Resource Locator (URL) that causes, upon recognition by a web browser of the user device, a redirection to a primary content provider. The enabling Uniform Resource Locator (URL) includes a destination indicator that indicates a second content request is to be directed to the primary content provider. The primary content provider and the secondary content provider have a relationship such that the primary content provider provides location-based data to the secondary content provider. The enabling Uniform Resource Locator (URL) also includes a secondary provider indicator that indicates to the primary content provider that the location-based data received by the primary content provider in association with the content request is to be relayed to the secondary content provider.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

CD Compact Disc
CD-ROM Compact Disk Read Only Memory
DVD Digital Versatile Discs
EEPROM Electrically Erasable Programmable Read Only Memory
IP Internet Protocol
MAG Mobile Access Gateway
MDN Mobile Directory Number
MP3 MPEG-1 Audio Layer 3
NAI Network Access Identifier
PC Personal Computer
PDA Personal Digital Assistant
RAM Random Access Memory
ROM Read Only Memory URL Uniform Resource Locator
WAP Wireless Application Protocol
URL Uniform Resource Locator Further, various technical terms are used throughout this description. An illustrative resource that fleshes out various aspects of these terms can be found in *Newton's Telecom Dictionary* by H. Newton, 24th Edition (2008).

Embodiments of the present invention may be embodied as, among other things: a method, system, or set of instructions embodied on one or more computer-readable media. Computer-readable media include both volatile and non-volatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for providing location-based data to secondary content providers via primary content providers. Location-based data refers to any location data in association with a user device. Location data can be any data including, but not limited to, x, y, and/or z coordinates, a street, a city, a state, a zip code, a county, a country, etc. In one embodiment, location-based data provides a location or position of a user device, such as a mobile device. In such an embodiment, location-based data might be provided by a location provider, or another component, that recognizes the location of a user device. Accordingly, the location-based data is not input by a user but rather automatically determined by a location provider, or another component, that might be integrated with or in communication with a user device or a content request controller. In an alternative embodiment, location-based data provides a preferred location of a user or user device. For example, a user may be visiting Chicago, but might prefer to have any web-based content presented via the user device correspond with the user's home location of New York City. Such location-based data might be input by a user via a user device or another computing device.

Utilizing location-based data enables a content provider to provide enhanced web-based content. Web-based content, as used herein, refers to any web content being provided by a content provider, such as a web server. Web content can be any content including, but not limited to, a web site, a web page, an on-line books, a video, a games, an image, a flash file, a multimedia file, a script, an html document, and/or any other type of content, or portions thereof, in association with a website. As such, web-based content can be, for example, audio content, video content, text content, image content, a combination thereof, or the like. In some cases, web-based content is enhanced (i.e., enhanced web-based content). Enhanced web-based content refers to any web content being provided by a content provider that includes content enhancements. Such content enhancements enable web-based content to be specific, applicable, customized, or personalized to a particular user or user device. To provide enhanced web-based content, a content provider can utilize received location-based data to provide web content pertaining to or specific to the user device, or user associated therewith. As such, a user can view web-based content that relates to or is of interest to the user, rather than viewing general web-based content that might be provided to other user devices for which the content provider does not have device-based data.

By way of example only, enhanced web-based content might be web content provided by a content provider that relates to a location of the user device. Accordingly, enhanced web-based content provided to a user might contain advertisements, movies, weather, or other information related to the location of the user device. For instance, a user that requests content for a particular store may appreciate web-based content that includes information regarding the nearest location of the store relative to the current location of the user device.

A primary content provider refers to a content provider that receives location-based data and can provide, relay, or communicate the location-based data to a secondary content provider. A content provider can be any computing device, such as a web server, that provides web-based content. In embodiments, primary content providers, or a domain name or a service provider associated therewith, have an established relationship with a content request controller or a service provider associated therewith (e.g., a wireless telecommunications network provider that operates a content request controller). In such a case, one or more primary content providers might have a contractual relationship with a wireless telecommunications network provider such that the primary content providers can obtain location-based data. For example, a URL or domain name associated with a primary content provider might be registered with a wireless telecommunications network provider, or a portion thereof, so that content requests (e.g., HTTP requests) directed to the registered URL or domain name include location-based data. The primary content provider can then utilize the location-based data to provide enhanced web-based content to a user device. Alternatively or additionally, as discussed more fully below, the primary content provider can provide the location-based data to a secondary content provider.

A secondary content provider refers to a content provider that obtains location-based data via a primary content provider. In embodiments, secondary content providers (or a domain name, URL, or service provider associated therewith) have an established relationship with one or more primary content providers (or a domain name, URL, or service provider associated therewith). In such a case, a secondary content provider might have a contractual relationship with a primary content provider such that the primary content provider communicates location-based data to the secondary content provider.

By relaying location-based data through primary content providers to secondary content providers, a content request controller, or a service provider associated therewith (e.g., a wireless telecommunications network), can have a direct relationship with a reasonable or limited number of content providers (e.g., primary content providers or domain names or service providers associated therewith). In this regard, a content request controller can process content requests more efficiently. In addition, a service provider associated with a content request controller can more efficiently manage or transact (e.g., bill, establish agreements, etc.) with primary content providers when such providers are limited in number. The relationship between a primary content provider and a secondary content provider enables content providers other than those in a direct relationship with a service provider that operates a content request controller to obtain location-based data such that the content provider can provide enhanced web-based data to user devices.

Figure 1:
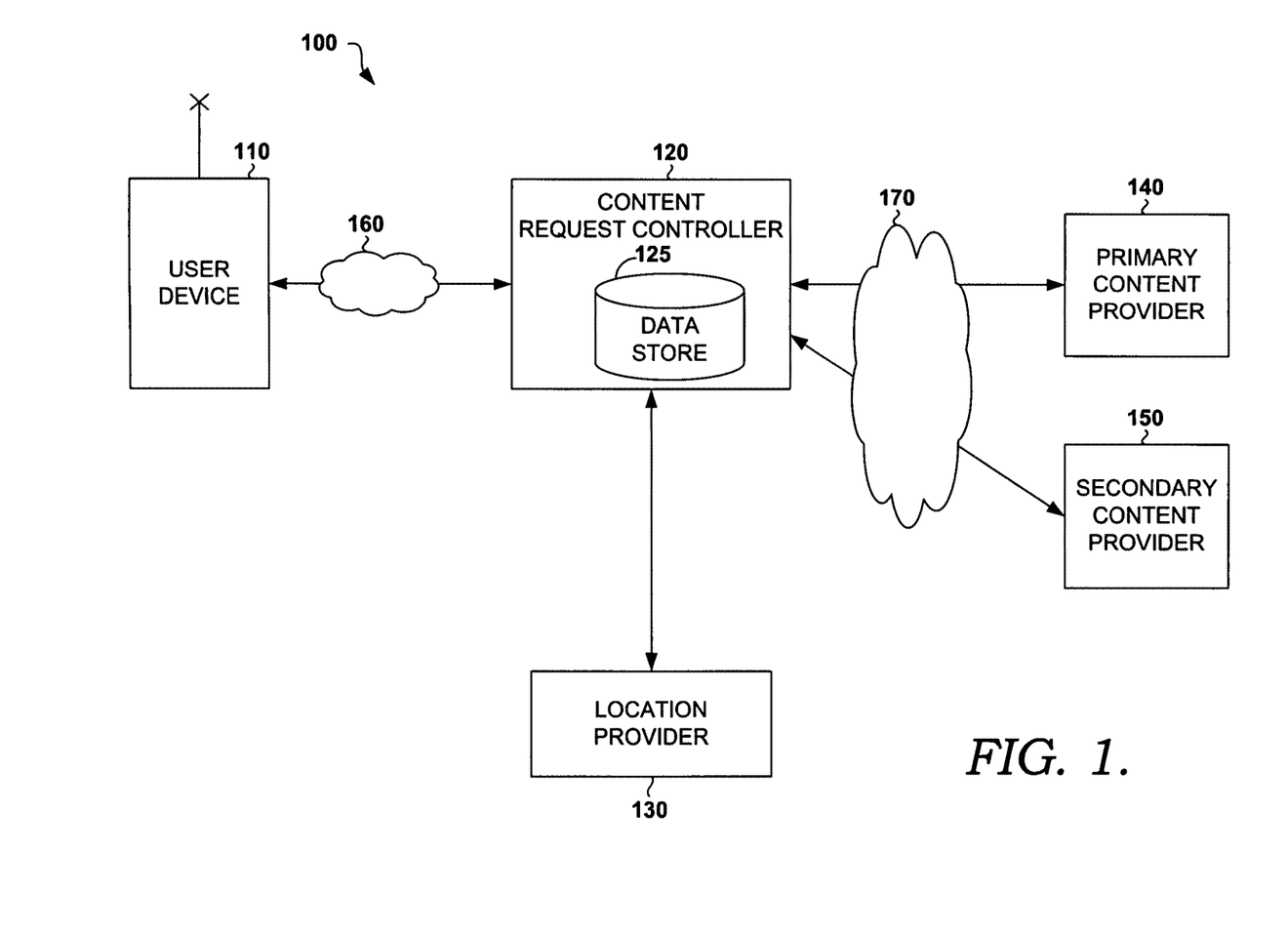
FIG. 1 depicts a computing system for providing location-based data to secondary content providers via primary content providers, in accordance with an embodiment of the present invention.

Referring to the drawings generally, and initially to FIG. 1 in particular, an exemplary computing system 100 for providing location-based data to secondary content providers via primary content providers is provided in accordance with an embodiment of the present invention. As shown in FIG. 1, an exemplary computing system 100 includes a user device 110, a content request controller 120, a primary content provider 140, and a secondary content provider 150. The user device 110, the content request controller 120, the primary content provider 140, and the secondary content provider 150 can communicate by way of network 160 and/or network 170. Network 160 and/or network 170 could be wired, wireless, or both. Networks 160 and 170 can be combined into a single network or can include multiple networks, as well as being a network of networks, but is shown in more simple form so as to not obscure other aspects of the present invention. For example, networks 160 and/or 170 may include one or more wide area networks (WANs), one or more local area networks (LANs), one or more public networks, such as the Internet, and/or one or more private networks. Networks 160 and/or 170 might include an array of devices, which are not shown so as to not obscure more relevant aspects of the invention. In a wireless telecommunications network, components such as a base station, a communications tower, or even access points (as well as other components) can provide wireless connectivity in some embodiments. By way of example only, network 160 might include a wireless telecommunications network while network 170 includes the Internet. Although single components are illustrated for clarity, one skilled in the art will appreciate that networks 160 and/or 170 can enable communication between any number of user devices, content request controllers, primary content providers, and secondary content providers. In embodiments, the user device 110, the primary content provider 140, and/or the secondary content provider 150 utilize wireless application protocol (WAP) to enable Internet access from a mobile phone.

The user device 110 can be any computing device that is capable of web accessibility. That is, a user device 110 might be any computing device that can request, receive, and present web-based content. As such, the user device 110 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, the user device 110 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

The user device 110 generates and/or communicates content requests. In embodiments, the user device 110 communicates content requests to the content request controller 120 via network 160. A content request refers to any request (e.g., a data packet) that requests or indicates a desire for specific web-based content, such as a particular website, a webpage, a script, etc. By way of example, a content request provides a request for web-based content associated with a website provided by a content provider. In one embodiment, a content request is an HTTP request. A content request includes an indication of a content provider, or a domain name or service provider associated therewith, to which the content request is directed (e.g., a destination indicator). That is, a content request indicates a particular content provider (e.g., a primary content provider or a secondary content provider) to which the content request is to be transmitted or communicated. In some cases, a destination indicator within a content request indicates a primary content provider to which the content request is directed. In other cases, a destination indicator within a content request indicates a secondary content provider to which the content request is directed. A destination indicator might be any indicator that indicates a content provider to which the content request is directed, such as, for example, a domain name, an IP address, or the like. Such a destination indicator might be included within or be a portion of a URL within the content request. One skilled in the art will appreciate that a content request might include a variety of information, some of which will be discussed more fully below.

In some cases, the user device 110 generates and/or communicates an initial content request. An initial content request refers to a content request that is initially sent from a user device to obtain web-based content. That is, it is an initial request for web-based content associated with a particular content provider, or domain name, URL, or service provider associated therewith. Such an initial request can result in establishment of a session between the user device and the content provider. In embodiments, an initial content request includes a destination indicator to indicate a content provider to which the content request is directed. An initial content request might be directed to a primary content provider or a secondary content provider. By way of example only, an initial content request might include a URL (i.e., an initial URL) that indicates the destination content provider via a domain name, such as www.primarycontentprovider.net. An initial content request might be generated and/or communicated upon a user inputting or selecting desired web-based content. For instance, a user might input into a browser toolbar or select a URL associated with web-based content the user desires to view.

In other cases, the user device 110 generates and/or communicates an enabling content request. An enabling content request is a content request that is configured to enable location-based data to be provided to a secondary content provider via a primary content provider. Accordingly, an enabling content request might be directed to a primary content provider so that the primary content provider can provide location-based data to an appropriate secondary content provider. In embodiments, an enabling content request includes a destination indicator to indicate a content provider to which the content request is directed. As such, a destination indicator, such as a domain, might indicate a particular primary content provider to which the content request is directed. An enabling content request might also include, for example, a location indicator, a secondary provider indicator, a session indicator, any other indicator that indicates requested information or delivery associated therewith, or the like. A location indicator provides an indication to provide location-based data to a content provider, such as a secondary content provider. In embodiments, a location indicator might be an identification of a secondary content provider (e.g., a secondary provider indicator), location-based data, or any other indicator separate and distinct from the secondary provider indicator and location-based data. A secondary provider indicator provides an indication of a particular secondary content provider to which location-based data should be transmitted. Such an indicator provides notice to a primary content provider regarding which secondary content provider should receive the location-based data. A session indicator provides an indication of a session. Such a session indicator might identify, for example, a session established between a user device and a secondary content provider. Such indicators (i.e., a location indicator, a secondary provider indicator, a session indicator, etc.) might, in some embodiments, be included within or a portion of be a URL provided within a content request.

By way of example only, an enabling content request might contain a URL (i.e., an enabling URL) that includes a destination indicator, a location indicator, a provider indicator, and a session indicator (e.g., http://primaryID.com/location/secondaryID/sessionID). In such a case, a domain name within the URL (e.g., primary ID.com) might indicate a particular primary content provider to which the content request is directed while a path within the URL (e.g., /location/secondaryID/sessionID) might indicate that location-based data should be transmitted to a particular secondary content provider in association with a specific session. An enabling content request might be generated and/or communicated upon the user device 110, or a portion thereof (e.g., a web browser), recognizing an enabling URL or other data or indication to provide an enabling content request embedded within or in association with received web-based content or content response. Such web-based content or content response can be generated by a secondary content provider in response to an initial content request.

Upon requesting web-based content, the user device 110 receives web-based content. In one embodiment, web-based content is provided by the primary content provider 140 or the secondary content provider 150 via the content request controller 120. In an alternative embodiment, web-based content can be provided to a user device 110 directly from the primary content provider 140 or secondary content provider 150. The web-based content received might be of a general nature or enhanced nature. For example, in instances where location-based data is provided to a content provider, the web-based content received in response to a content request may include enhanced web content. Web-based content received by the user device 110 might be visibly output (i.e., displayed) and/or audibly output to a user via the user device 110.

One skilled in the art will appreciate that web-based content might be presented to a user in response to an initial content request or in response to an enabling content request. By way of example only, assume that a secondary content provider receives an initial content request and, in response, provides web-based content including an enabling URL to the requesting user device. In some cases, the user device might present the web-based content, or a portion thereof, to the user via the user device. In other cases, the user device might communicate an enabling content request so that enhanced web-based content is obtained prior to presenting any content to the user. This might be the case in instances where the initial content response or web-based content does not include any content to be presented to a user, or alternatively, enhanced web-based content is to be obtained prior to presenting any content (e.g., a redirection script is executed prior to providing any content to a user).

The content request controller 120 provides content requests to content providers, such as the primary content provider 140 and/or the secondary content provider 150. The content request controller 120 can be any computing device or group of computing devices that is capable of providing requests to content providers. As such, the content request controller 120 might be a server(s), a proxy, a gateway(s) (e.g., a mobile access gateway (MAG)), or another other computing device(s). A MAG serves as an interface between one or more content providers, such as a web server, and one or more user devices, such as mobile devices. As such, a MAG might translate or convert protocols associated with one network, such as network 160, to a protocol associated with another network, such as network 170.

The content request controller 120 receives content requests (e.g., initial content requests and/or enabling content requests) from user devices, such as the user device 110. Upon receiving a content request, the content request controller 120 utilizes an indication of a content provider to which the content request (e.g., a domain name) is directed to determine whether to provide location-based data to the content provider. That is, based on an indication of a content provider to which the content request should be transmitted or communicated from the content request controller, the content request controller identifies whether to provide location-based data (i.e., whether the content provider is one to which location-based data is to be provided). Such an indication might be provided within the content request via a destination indicator, such as a domain name, within a URL.

In one embodiment, the content request controller 120 provides location-based data to primary content providers and does not provide location-based data to secondary content providers. As such, if a content request is associated with or directed to a primary content provider, the content request controller 120 provides location-based data to the primary content provider. The content request controller 120 might provide location-based data via the content request, or a modified or new version thereof. That is, the content request controller 120 might include location-based data within the content request or in association with the content request such that the primary content provider receives the location-based data. Alternatively, location-base data can be transmitted separate and apart from a content request. For example, a content request can be communicated to a primary content provider while location-based data might be communicated to the primary content provider at another time (e.g., prior to or following a content request). Conversely, if a content request is associated with or initially directed to a secondary content provider, for example, according to a destination indicator within a URL, the content request controller 120 does not provide location-based data to the secondary content provider. Accordingly, the content request controller 120 might forward or communicate the content request, or a modified or new version thereof, to the secondary content provider without including location-based data.

In embodiments, the content request controller 120 recognizes an indication of a content provider to which the content request is directed, such as a destination indicator. Such an indication might be provided as a domain name within a URL included in a content request. Upon recognizing the indication, the content request controller 120 identifies whether such a content provider is a primary content provider or a secondary content provider. That is, the content request controller 120 determines whether the content request corresponds with a primary content provider or a secondary content provider. In this regard, the content request controller 120 can identify whether the content provider to which the content request is directed is one for which location-based data is to be provided. The content request controller 120 might utilize an algorithm or a lookup system to determine the type of content provider (e.g., primary content provider or secondary content provider) with which a content request is directed to or associated.

In one implementation, to determine if the content request corresponds with a primary content provider (e.g., whether the content request is initially directed to a primary content provider), the content request controller 120 may reference a set of one or more provider identifiers that are associated with one or more content providers. A provider identifier refers to any identifier that identifies a content provider, or a domain or service provider associated therewith, such as, for example, a URL, a domain name, an IP address, or the like. In embodiments, a set of primary provider identifiers (i.e., provider identifiers that identify primary content providers) are stored within a data store, such as data store 125. For example, the data store might contain a set of domain names or URLs. The primary provider identifiers in the data store 125 may each be associated with a primary content provider. By comparing a destination indicator in association with a content request to primary provider identifiers within the data store 125, the content request controller 120 can determine whether the destination indicator associated with the content request corresponds with a primary content provider. As such, the content request controller 120 can determine whether to provide location-based data to the content provider. In one embodiment, if the destination indicator associated with the content request is listed in the data store 125, the content request is associated with a primary content provider. Conversely, if the destination indicator associated with the content request is not listed in the data store 125, it can be determined that the content request is associated with a secondary content provider. Accordingly, a destination indicator associated with a content request may be recognized as being associated with a secondary content provider if, for example, the destination indicator does not correspond with a primary provider identifier within the data store.

Alternatively, the data store 125 may contain a listing of secondary content providers or a combination of primary content providers and secondary content providers. By way of example only, a destination indicator associated with a content request that matches a secondary provider identifier in the data store 125 may result in a determination that a content request is associated with a secondary content provider. On the other hand, a provider identifier associated with a content request that fails to match a secondary provider identifier in the data store 125 may be determined to be associated with a primary content provider. The data store 125 might be integrated with or remote from the content request controller 120.

In another implementation, a content request may include an indication (e.g., an association indicator) that the content request is associated with a primary content provider or a secondary content provider. An association indicator might be, for example, a symbol, an icon, text, a number, or any other indicator that indicates the content request is associated with a primary content provider or is associated with a secondary content provider.

One skilled in the art will appreciate that in instances that location-based data is to be provided to a content provider, such location-based data can be obtained in any number of ways. As such, location-based data might be identified, determined, calculated, referenced, or the like, via the content request controller 120, or another component in communication therewith (e.g., a location provider that provides locations of devices, etc.). In some implementations, the content request controller 120 may obtain location information via a location provider 130. For example, upon determining a content request is associated with or directed to a primary content provider, the content request controller 120 may generate a location-based data request. The data request may be transmitted from the content request controller 120 to the location provider 130. A data request might include, for example, a device identifier (e.g., a MDN, an NAI, an IP address, or the like) that identifies the user device 110 such that the location of the user device 110 can be provided. The location provider 130 may respond to the data request by returning location-based information, such as x, y, and/or z coordinates of the user device 110, to the content request controller 120. Such location-based data might be provided to the content request controller 120 via a location-based data response. In alternative implementations, location-based data might be provided to a content request controller 120 via the user device 110, for example, in association with the content request.

In some embodiments, the content request controller 120 determines whether to provide location-based data to a content provider upon recognizing an indication that location-based data is desired to be transmitted to the content provider (e.g., a location indicator). That is, upon recognizing a location indicator, the content request controller 120 determines if the content request is associated with a primary content provider or a secondary content provider. A location indicator provides an indication that location-based data is desired to be communicated to a content provider. In one implementation, location-based data included within a content request received by the content request controller 120 might provide an indication that such data be transmitted to a content provider. In this regard, location-based data may be automatically included in a content request generated by the user device 110. Alternatively, a content request may include a request or an indication to provide location-based data to a content provider (e.g., a location indicator). In this regard, a location indicator might be automatically included in a content request, for example, based on the particular web-based content (e.g., site) requested, the subject matter or category of web-based content (e.g., weather-related site, entertainment-related site, etc), or the like. For example, assume the user device 110 recognizes (e.g., via an algorithm, lookup system, code, or the like) that a requested website can use location data to provide enhanced web-based content. In such a case, the content request might include a location indicator, such as text, a symbol, or a number, to indicate that some or all location-based data is desired to be provided to a content provider associated with the desired web-based content.

The primary content provider 140 can be any computing device(s) that provides web-based content. In one embodiment, the primary content provider 140 is a web server in association with a website or webpage. The primary content provider 140 receives content requests. In embodiments, the content requests are generated at the user device 110 and communicated to the primary content provider via the content request controller 120. Upon receiving a content request, the primary content provider 140 functions in accordance with the content request. If the received content request is an initial content request that requests web-based content to be provided to a user device, the primary content provider 140 provides web-based content. If the primary content provider 140 is provided with location-based data, the web-based content provided by the primary content request might be enhanced web-based content. The web-based content (e.g., enhanced web-based content) might be communicated to the user device 110 via the content request controller 120.

On the other hand, if the received content request is an enabling content request, the primary content provider 140 recognizes an indication to provide location-based data to a corresponding secondary content provider. In accordance therewith, the primary content provider 140 provides the received location-based data to the secondary content provider. By way of example only, assume that the primary content provider 140 receives a content request having an indication to provide location-based data to a particular secondary content provider. Such a content request might include, for example, a destination indicator so that the primary content provider 140 properly receives the enabling content request, location-based data that can be provided to the secondary content provider, a secondary provider indicator that indicates a particular secondary content provider to which the location-based data should be transmitted, and the like. Upon recognizing an indication to provide location-based data to a secondary content provider, such as secondary content provider 150, rather than the primary content provider 140 providing web-based content to a user device, the primary content provider 140 transmits location-based data to the corresponding secondary content provider. Such location-based data might be transmitted via the content request, or a modified or new version thereof.

The secondary content provider 150 can be any computing device(s) that provides web-based content. In one embodiment, the secondary content provider 150 is a web server in association with a website or a webpage. The secondary content provider 150 might receive content requests originated from the user device 110 via content request controller 120 and/or primary content provider 140. In response to receiving an initial content request that requests web-based content to be provided to a user device, the secondary content provider 150 provides web-based content. As the secondary content provider 150 may not have been provided with location-based data, such web-based content might be general web-based content. In embodiments, the web-based content provided to the user device includes an enabling indicator, such as an enabling URL. Such an enabling indicator provides an indication to redirect to a primary content provider so that location-based data can be obtained by the secondary content provider. An enabling indicator might be generated, copied, or referenced by the secondary content provider for inclusion in the web-based content.

Figure 2:
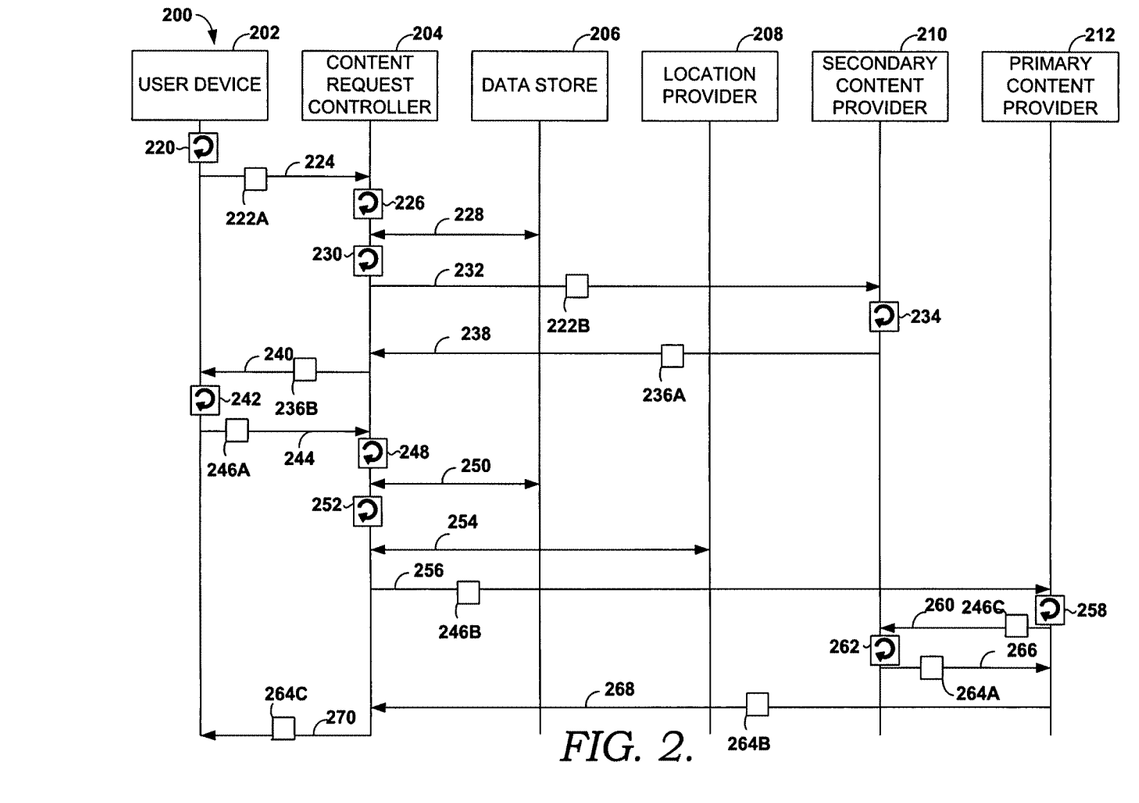
FIG. 2 illustrates a flow diagram of a process for providing location-based data to secondary content providers via primary content providers, in accordance with an embodiment of the present invention.

FIG. 2 illustrates a flow diagram 200 of a method for providing location-based data to a secondary content provider via a primary content provider in accordance with an embodiment of the present invention. Initially, as shown at block 220, a user device 202 generates a first content request (e.g., an initial content request). The first content request might contain, for example, a destination indicator in the form of a domain name within a URL (e.g., an initial URL). Generation of a first content request might be automatically initiated or initiated by a user. A content request 222a is communicated 224 to a content request controller 204. Upon receiving the content request 222a, the content request controller 204 recognizes 226 a particular content provider to which the content request is directed. For example, the content request controller 204 might recognize a content provider based on a domain name or URL included within the content request. The content request controller 204 references 228 a data store 206. The data store may contain information relating to primary content providers, secondary content providers, or a combination thereof. For example, the data store might include a list of provider identifiers, such URLs, IP addresses, domain names, or the like. One skilled in the art will appreciate that although the data store 206 is illustrated in FIG. 2 as a component remote from the content request controller 204, the data store 206 might, in another embodiment, be integrated with the content request controller 204 or another component.

Using the information within the data store 206, such as a list of primary content providers identified by corresponding URLs or domain names, the content request controller 204 determines 230 whether the content request is directed to, or is associated with, a content provider to which location-based data is to be provided. In this regard, it might be determined whether the content request is directed to a primary content provider or a secondary content provider. Assume that the content request controller 204 identifies that the content request 222a is directed to a secondary content provider 210. Further assume that the content request controller 204 does not provide location-based data to secondary content providers. In such a case, the content request controller 204 communicates 232 a content request 222b that fails to include location-based data to the secondary content provider 210. Upon receiving the content request 222b, the secondary content provider 210 provides 234 web-based content. Because the secondary content provider 210 does not receive location-based data, the secondary content provider 210 provides general web-based content, rather than enhanced web-based content. In embodiments, the web-based content includes an enabling indicator, such as an enabling URL, so that the secondary content provider 210 can receive location-based data to later provide enhanced web-based content. Web-based content 236a is transmitted 238 to the content request controller 204, which transmits 240 web-based content 236b to the user device 202.

Upon receiving the web-based content 236b, the user device 202 recognizes 242 an enabling indicator that corresponds with the web-based content. In embodiments, the enabling indicator might be embedded within the web-based content delivered to the user device. In one embodiment, the user device might present the received web-based content 236b, or a portion thereof, to a user via the user device 202. In another embodiment, the user device might receive the web-based content 236a including the enabling indicator but not present any web-based content 236a to a user. In response to recognizing an enabling indicator, the user device 202 communicates 244 a second content request 246a (e.g., an enabling content request) to the content request controller 204. The second content request might include, for example, a destination indicator to indicate to which content provider the content request is directed and a provider indicator to indicate to which secondary content provider the primary content provider should relay location-based data. Such a second content request might be generated using an enabling URL provided within the content received by the user device. Upon receiving the second content request 246a, the content request controller 204 recognizes 248 a particular content provider to which the content request is directed.

The content request controller 204 references 250 the data store 206. Using the information within the data store 206, such as a list of primary content providers identified by corresponding URLs, the content request controller 204 determines 252 whether the second content request is directed to, or is associated with, a content provider to which location-based data is to be provided. In this regard, it might be determined that the second content request is associated with a primary content provider or a secondary content provider. Assume that the content request controller 204 identifies that the second content request 246a is directed to the primary content provider 212. Further assume that the content request controller 204 provides location-based data to primary content providers. In such a case, the content request controller 204 obtains 254 location-based data indicating the location of the user device 202 from the location provider 208. Such location-based data might include x, y, and/or z coordinates of the user device 202. The content request controller 204 then communicates 256 a second content request 246b that includes the location-based data to the primary content provider 212.

Upon receiving the second content request 246b, the primary content provider 212 recognizes 258 an indication to provide the location-based data, or the content request associated therewith, to the secondary content provider 210. Thereafter, the primary content provider 212 communicates 260 a content request 246c, or location-based data, to the secondary content provider 210. The content request 246c includes the location-based data received by the primary content provider 212. Because the secondary content provider 210 receives location-based data, the secondary content provider 210 provides 262 enhanced web-based content. Enhanced web-based content 264a is transmitted 266 to the primary content provider 212, which transmits 268 enhanced web-based content 264b to content request controller 204. The content request controller 204 transmits 270 enhanced web-based content 264c to the user device 202. Upon receiving the enhanced web-based content 260c, the user device 202 presents the enhanced web-based content. As such, a user can appreciate web-based content that is specific or applicable to the location of the user or user device associated therewith.

Figure 3:
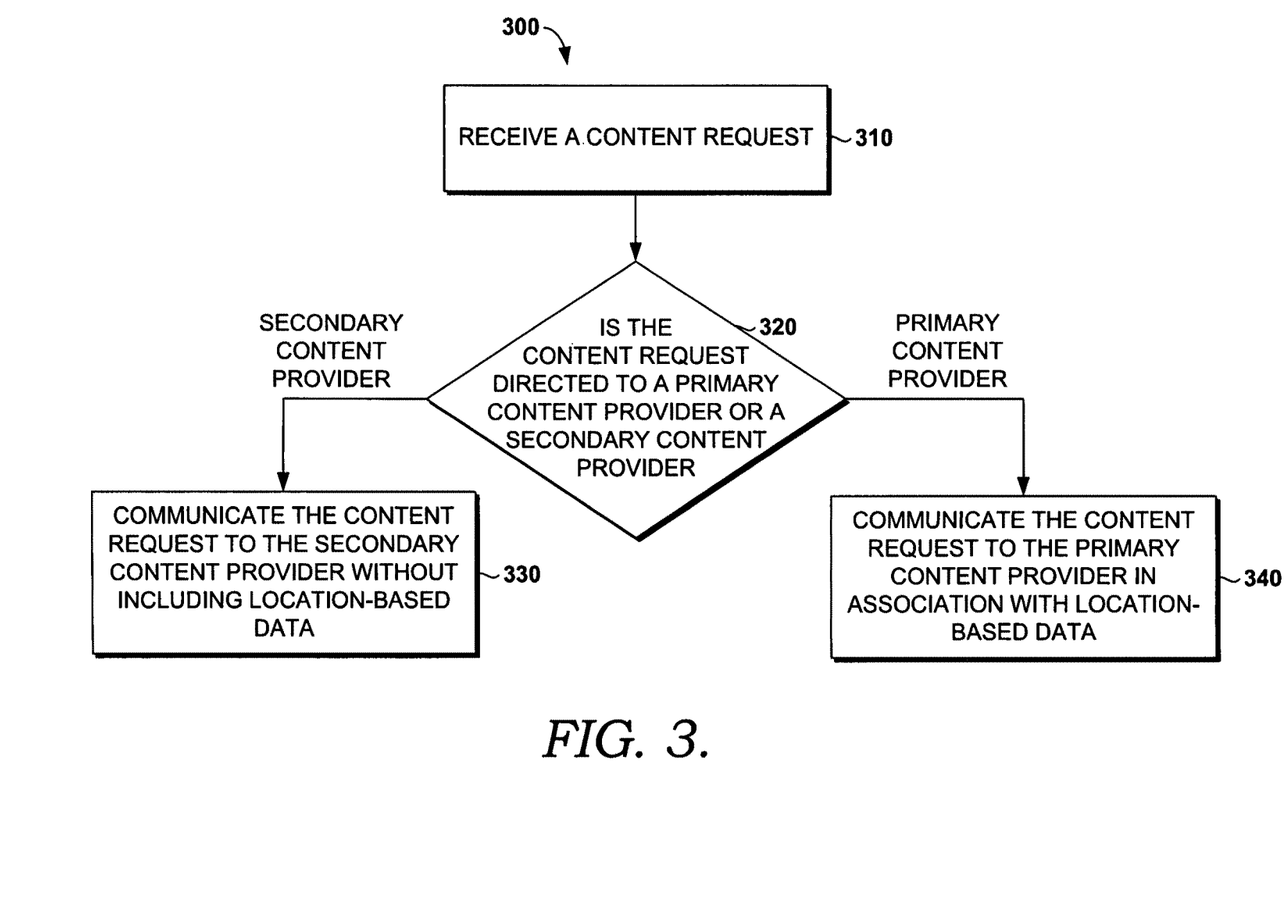
FIG. 3 illustrates a method for providing location-based data to a primary content provider for relaying to a secondary content provider, in accordance with an embodiment of the present invention.

FIG. 3 illustrates a flow diagram 300 of a method for providing location-based data to a primary content provider for relaying to a secondary content provider, in accordance with an embodiment of the present invention. Initially, as indicated at block 310, a content request is received from a user device. The content request might include a destination indicator that indicates a content provider to which the content request is directed and a secondary provider indicator that indicates a secondary content provider to which location-based data is to be transmitted. Thereafter, at block 320, it is determined if the content request is directed to a primary content provider or a secondary content provider. To make such a determination, a destination indicator provided within the content request might be utilized and a data store might be referenced to identify whether the content provider to which the content request is directed is a primary content provider or a secondary content provider. If the content request is directed to a secondary content provider, as indicated at block 330, the content request is communicated to the secondary content provider without including location-based data. If, on the other hand, is directed to a primary content provider, as indicated at block 340, the content request is communicated to the primary content provider in association with location-based data. The primary content provider can then recognize that the location-based data should be transmitted to the secondary content provider and, as a result, provide the location-based data in accordance therewith.

Figure 4:
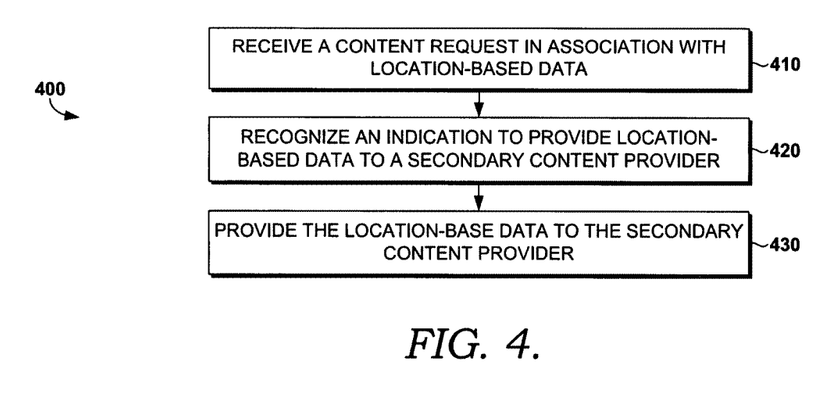
FIG. 4 illustrates a method for providing location-based data to a secondary content provider, in accordance with an embodiment of the present invention.

FIG. 4 illustrates a flow diagram 400 of a method for providing location-based data to a secondary content provider, in accordance with an embodiment of the present invention. Initially, as indicated at block 410, a primary content provider receives a content request in association with location-based data. The content request might include location-based data that provides a location of a user device and a secondary provider indicator that indicates a secondary content provider to which the location-based data is to be transmitted. Subsequently, at block 420, an indication to provide the location-based data to a secondary content provider is recognized. Such an indication might be provided within a URL contained within the content request. At block 430, location-based data is provided to the secondary content provider. As such, the secondary content provider can provide web-based content related to the location of the user device.

Figure 5:
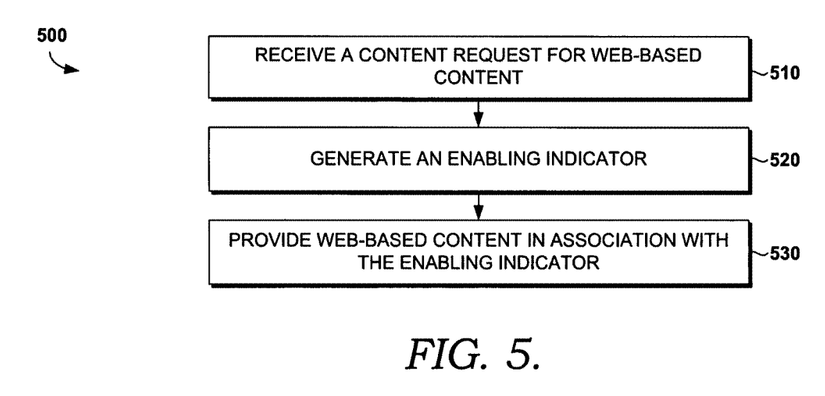
FIG. 5 illustrates a method for providing web-based content to a user device, in accordance with an embodiment of the present invention.

FIG. 5 illustrates a flow diagram 500 of a method for providing web-based content to a user device, in accordance with an embodiment of the present invention. Initially, as indicated at block 510, a secondary content provider receives a content request that requests for web-based content to be provided to a user device. Thereafter, at block 520, an enabling indicator is generated. An enabling indicator provides an indication to redirect to a primary content provider so that location-based data can be obtained by the secondary content provider. The enabling indicator, such as an enabling URL, might include a destination indicator that causes redirection to a primary content provider and a secondary provider indicator that indicates to the primary content provider that location-based data received by the primary content provider is to be relayed to the secondary content provider. At block 530, web-based content in association with the enabling indicator is provided to the user device. The enabling indicator can result in a redirection to a primary content provider upon the web browser of the user device recognizing the enabling indicator.

Many different arrangements of the various components depicted, as well as components not shown, are possible without departing from the scope of the claims below. For example, although discussed herein as providing location-based data to a secondary content provider, embodiments of this invention can be used to provide any type of data to a secondary content provider via a primary content provider. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed by a computing device, perform a method for providing location-based data to secondary content providers via primary content providers, the method comprising:

at a content request controller operated by a service provider, receiving a content request from a user device, wherein the content request includes:
a destination indicator that indicates a primary content provider to which the content request is directed,
a secondary content provider indicator that indicates a particular secondary content provider associated with the requested content;
prior to communicating the content request from the content request controller to the primary content provider, identifying that the location of the user device is to be provided to the primary content provider by determining that the destination indicator indicating the primary content provider is stored in a data store that stores destination indicators of primary content providers to which providing user device location information is permitted;

retrieving, by the content request controller, the location of the user device from a location provider when the primary content provider is identified as a primary content provider to which providing user device location information is permitted; and providing the content request and the location of the user device from the content request controller to the primary content provider, wherein the primary content provider relays the location of the user device to the particular secondary content provider, and wherein the location of the user device is relayed to the particular secondary content provider when there is no direct relationship between the service provider and the particular secondary content provider due to the service provider limiting the number of direct relationships.

2. The one or more computer-readable media of claim 1, wherein the content request includes a session indicator that indicates a session established between the particular secondary content provider and the user device.

3. The one or more computer-readable media of claim 1, wherein the content request includes a location indicator that indicates to provide the location of the user device to one or more of the primary content provider and the particular secondary content provider.

4. The one or more computer-readable media of claim 1, wherein the destination indicator and the particular secondary provider indicator are included within an enabling Uniform Resource Locator (URL) that redirects to the primary content provider.

5. The one or more computer-readable media of claim 4, wherein the destination indicator is a domain name within the enabling Uniform Resource Locator (URL).

6. The one or more computer-readable media of claim 1, wherein the data store further stores a set of-one or more provider identifiers that identify a set of primary content providers, a set of secondary content providers, or a combination thereof.

7. The one or more computer-readable media of claim 6, wherein the set of one or more provider identifiers identify a set of primary content providers using Uniform Resource Locators (URLs) or domain names of destination indicators.

8. One or more non-transitory computer-readable media having computer-executable instructions embodied thereon that, when executed by a computing device, perform a method for providing location-based data to secondary content providers via primary content providers, the method comprising:

at a primary content provider:

receiving, via a content request controller operated by a service provider, a content request originating from a user device that includes:

a location of the user device, and a secondary provider indicator that indicates a particular secondary content provider associated with the requested content;

identifying that the secondary provider indicator is an indication for the primary content provider to provide the location of the user device to the particular secondary content provider identified in the content request; and providing, from the primary content provider, the location of the user device of the content request directly to the particular secondary content provider, wherein the particular secondary content provider can provide web-based content related to the location of the user device, and wherein the location of the user device is provided by the primary content provider to the particular secondary content provider when there is no direct relationship between the service provider and the particular secondary content provider due to the service provider limiting the number of direct relationships.

9. The one or more computer-readable media of claim 8, wherein the primary content provider and the particular secondary content provider provide requested web-based content to the user device.

10. The one or more computer-readable media of claim 8, wherein the indication to provide the location of the user device to the particular secondary content provider comprises a location indicator, wherein the location indicator indicates to provide the location of the user device to one or more of the primary content provider and the particular secondary provider that is associated with requested web-based content.

11. The one or more computer-readable media of claim 8, wherein the particular secondary provider indicator is contained within a path of a Uniform Resource Locator (URL) in association with the content request.

12. The one or more computer-readable media of claim 8, wherein the location-based data is transmitted to the particular secondary content provider via the content request.

13. One or more non-transitory computer-readable media having computer-executable instructions embodied thereon that, when executed by a computing device, perform a method for providing location-based data to secondary content providers via primary content providers, the method comprising:

at a secondary content provider:

receiving, via a primary content provider, a first content request originating from a user device, wherein the first content request requests web-based content to be provided to the user device; and in response to the first content request, providing the requested web-based content to the primary content provider for transmission to the user device, wherein the web-based content that is provided further includes an embedded enabling Uniform Resource Locator (URL) that causes, upon recognition by a web browser of the user device, a redirection of the web browser of the user device to the primary content provider, the enabling Uniform Resource Locator (URL) comprising:

a destination indicator, wherein the destination indicator redirects a second and subsequent content request from the user device to the primary content provider instead of the secondary content provider, and a secondary provider indicator, wherein the secondary provider indicates to the primary content provider that, when a location of the user device is received by the primary content provider in the second and subsequent content request from the user device, the primary content provider is to relay the location of the user device to the secondary content provider, and wherein the location of the user device is relayed from the primary content provider to the secondary content provider when there is no direct relationship between the service provider and the secondary content provider due to the service provider limiting the number of direct relationships.

14. The one or more computer-readable media of claim 13, wherein the enabling Uniform Resource Locator (URL) includes a session indicator that indicates a session established between the secondary content provider and the user device.

15. The one or more computer-readable media of claim 13 further comprising receiving the location of the user device from the primary content provider and using the location of the user device to provide the user device with additional web-based content related to the location of the user device.

* * * * *